March 27, 1962 P. F. HAYNER ET AL 3,026,638
AUTOMATIC BLADE SLOPE CONTROL SYSTEM
Filed Jan. 28, 1960 6 Sheets-Sheet 1

Paul F. Hayner
Thomas W. Thompson
Clifford R. Walker
Melvin G. Pfeifer
Herbert W. Campman, Jr.
Howard W. Boothroyd
INVENTORS Paul F. Hayner
Thomas W. Thompson
Clifford R. Walker
Melvin G. Pfeifer
Herbert W. Campman, Jr.
Howard W. Boothroyd
*INVENTORS*

Paul F. Hayner
Thomas W. Thompson
Clifford R. Walker
Melvin G. Pfeifer
Herbert W. Campman, Jr.
Howard W. Boothroyd
INVENTORS March 27, 1962  P. F. HAYNER ET AL  3,026,638
AUTOMATIC BLADE SLOPE CONTROL SYSTEM
Filed Jan. 28, 1960  6 Sheets-Sheet 4

Paul F. Hayner
Thomas W. Thompson
Clifford R. Walker
Melvin G. Pfeifer
Herbert W. Campman, Jr.
Howard W. Boothroyd
*INVENTORS*

March 27, 1962  P. F. HAYNER ET AL  3,026,638
AUTOMATIC BLADE SLOPE CONTROL SYSTEM
Filed Jan. 28, 1960  6 Sheets-Sheet 6

Paul F. Hayner
Thomas W. Thompson
Clifford R. Walker
Melvin G. Pfeifer
Herbert W. Campman, Jr.
Howard W. Boothroyd
*INVENTORS*

United States Patent Office 3,026,638
Patented Mar. 27, 1962

3,026,638
AUTOMATIC BLADE SLOPE CONTROL SYSTEM
Paul F. Hayner and Thomas W. Thompson, Nashua, N.H., Clifford R. Walker, Dracut, Mass., Melvin G. Pfeifer, Middlebury, Conn., Herbert W. Campman, Jr., and Howard W. Boothroyd, Amherst, N.H., assignors to Sanders Associates, Inc., Nashua, N.H., a corporation of Delaware
Filed Jan. 28, 1960, Ser. No. 5,269
18 Claims. (Cl. 37—156)

This invention relates generally to earth moving equipment for moving earth in a predetermined manner along the surface of the earth. More particularly, the invention is directed to an automatic angular control for maintaining a road grader blade at a preset slope during operation. While the invention is subject to a wide range of applications, it is especially suited for use in road grading apparatus for precise levelling and grading of earth at a predetermined angle and will be particularly described in that connection. The expression "axis of motion of the vehicle" as used herein is intended to define a line extending in the direction of vehicle motion.

With the advent of modern super highways and high-speed travel, the accuracy required for finished road grades has been increased to eliminate ripples and bumps. In many locales, the accuracy of the required slope is one-eighth of an inch in ten feet, or in terms of road graders, one-eighth of an inch error between the ends of the grader blade.

In manually operated machines, the operator controls each side of the blade with manual valves that direct hydraulic fluid to actuators adjusting the height of each side of the blade. The operator is expected to maintain the desired angle or level of the blade by continually adjusting the blade angle as the grader moves over uneven ground. The problem of the blade control is further complicated by a requirement to keep the blade at a depth equal to surveyors' stakes set into the road bed to show the finished grade level. A grader operator must be thoroughly experienced and have excellent reflexes to manually control the finished grade to the required accuracy. To simplify the operator's job and give a more accurate finished grade there are shown in the prior art several automatic blade control systems. Any automatic control system must sense true vertical and control the blade to maintain a predetermined level or grade even over rough terrain. The system must function accurately irrespective of grader orientation with respect to a reference axis, the orientation of the grader blade with respect to the grader, and irrespective of grader dynamics and vibrations.

There are described in the prior art various electromechanical blade control systems. A blade slope control system utilizing electro-mechanical elements is disclosed in U.S. Patent No. 2,904,911 issued to D. D. Colee on September 22, 1959. In the aforementioned system, electric motors which are necessarily large in size are used. In order to achieve greater system compactness the present system utilizes a small electro-hydraulic valve for controlling blade position. The aforementioned patent also shows the reference sensing means mechanically coupled to the grader blade thus making the reference sensing means subject to dynamic vibrations and oscillations of the grader blade. In the present invention, the reference sensing means are located on or near the C.G. of the rigid grader frame and not mechanically coupled to the blade. Therefore, in contrast to the aforementioned patent, the reference sensing means of this invention is relatively unaffected by the grader blade dynamics. In addition, a novel feature of the present invention is an inexpensive, simple, mechanical means for indication of the actual blade cutting angle as contrasted with relatively complex gyroscopic means disclosed in U.S. Patent 2,904,911. In addition, the prior art blade control systems are not continually operable over the full range of blade orientation. Another advantage of the present invention, therefore, is a linkage coupling the aforementioned blade angle indicating means to a feedback transducer allowing the system continuously to operate irrespective of grader blade orientation.

It is an object of the present invention to provide an improved automatic blade slope control system for a road grading machine.

It is a further object of the present invention to provide an improved automatic blade slope control system for a road grading machine having hydraulically actuated grader blades.

An additional object of the present invention is to provide a dynamically stable automatic blade slope control system for a road grading machine.

A further object of the present invention is to provide an automatic blade slope control system operable irrespective of grader blade orientation.

A further object of the present invention is to provide an improved mechanical resolving device.

In accordance with the present invention, there is provided an automatic blade slope control system in a vehicle for road grading. The vehicle includes a vehicle frame and a cutting blade assembly coupled to the frame. A cutting blade is coupled to the assembly. The blade is rotatable about an axis normal to its cutting edge. Means are provided for rotating the cutting blade about a normal axis defining member. Means for rotating the cutting blade and normal axis member are provided. Hydraulic means are included for controlling the orientation of the cutting blade.

A reference sensor means having an inertial mass is provided for defining a vertical reference axis. Reference transducer means are coupled to the reference sensor means for producing a reference electrical signal representative of a desired predetermined blade slope angle. There is also provided resolving means coupling the cutting blade and a feedback transducer means. The resolving means includes driving means coupled to the blade. The driving means have a member rotatable about an axis parallel to the normal axis member. There is also provided, a first pivot support means affixed to the driving means for providing a pivot support axis perpendicular to the normal axis member. Intermediate pivot means are provided, pivotally coupled to the pivot support means for relative pivotal motion about the pivot support axis. The intermediate pivot means are provided with second pivot support means affixed thereto for providing a second pivot support axis perpendicular to the first pivot support axis. There are also provided actuating means having a member coupled to the feedback transducer means. The actuator means are pivotally coupled to the support means for relative pivotal motion about the second support axis. The actuating means is rotated only in accordance with the rotation of the normal axis member in a plane perpendicular to the axis of motion of the vehicle.

Feedback transducer means having a rotatable member coupled to the actuating means are also provided. In operation, the feedback transducer means produce an electrical signal representative of the projected angle of the normal axis defining member relative to the vehicle frame in a plane perpendicular to the axis of motion of the vehicle. Comparator means are provided, coupled to the reference and feedback transducer means for providing an error signal in accordance with the algebraic sum of the reference and feedback signals. Additionally provided, are electro-hydraulic valve means coupled to the hydraulic means and responsive to the error signal for continuously controlling the orientation of the cutting blade at the desired predetermined blade slope angle.

For a better understanding of the present invention, together with other and further objects thereof, reference is made to the following description taken in connection with the accompanying drawings and its scope will be pointed out in the appended claims.

In the drawings, FIG. 1 is an outline drawing, partially schematic of a road grading machine embodying the automatic cutting blade slope control system of the present invention;

FIGS. 8 and 8a are detailed schematic electrical circuit drawings of the system in FIG. 6.

Since the road grader and its operation are well known in the art, its structure and operation will be described only insofar as is necessary to describe the present invention. The road grader includes a vehicle frame and a cutting blade assembly coupled to the frame. The cutting blade assembly includes a drawbar universally gimbaled to the forward end of the vehicle frame to which there is connected a cutting blade. The cutting blade has a circular gear attached thereto for rotation of the blade about an axis, in a substantially vertical plane normal to its cutting edge. In addition, the cutting blade assembly is movable relative to the frame so that the aforementioned normal axis rotates relative to a plane perpendicular to the axis of motion of the vehicle. Thus, the cutting blade may be used on either normal road grading or for banking the side of a road. Hydraulic means are provided for controlling the orientation of the cutting blade. The control system operates to maintain the blade at a preset slope angle and elevation irrespective of vehicle frame orientation or of blade orientation. An electrical signal which is related to the actual blade cutting angle is compared to an electrical signal which is related to the desired blade cutting angle. The control system operates to hydraulically reposition the blade to the desired angle thus making the algebraic difference between the aforementioned electrical signals zero.

Figure 2:
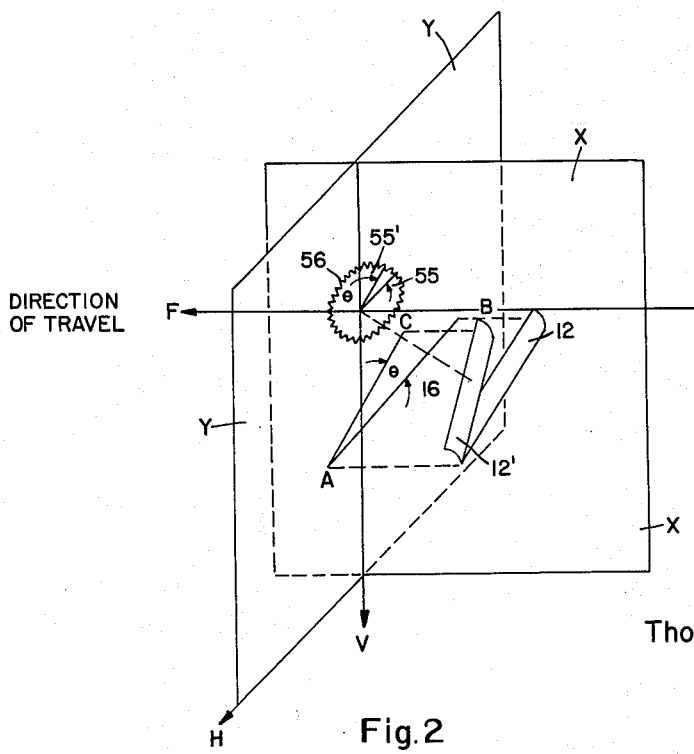
FIG. 2 is a vector diagram illustrating cutting blade orientation in terms of a normal to the cutting blade edge.

One of the major problems in a blade slope control system is that of obtaining the true blade cutting angle. Referring to FIGURE 2, the problem will be discussed in terms of an actual projected blade angle. FIGURE 2 discloses an axis F which is in the direction of travel of the roadgrader frame. Intersecting the axis F is a vertical axis V in the direction of the earth. The axis F and V form a vertical plane X. A horizontal or transverse axis H is shown intersecting the vertical axis V. It is therefore seen that the axis V and H form a plane Y, which plane intersects the plane X. It is this plane Y that schematically represents a cross section of the earth to be graded by the controlled blade system to be described hereafter.

There is also shown a schematic representation of a cutting blade 12 shown in two different positions. Connecting the blade 12 is a schematic mechanical resolver shown as line 16, which resolver 16 is in turn connected to a pickoff device which is located in the plane Y and is comprised of a pickoff resistant element 56 and an associated contact arm 55. It will be seen that as the blade 12 is moved to different positions the projected blade angle and its slope assume different positions in the plane Y. It is this projected line, for example A—B, which is the true projected blade slope angle and it is this line A—B which the earth sought to be graded experiences, when the table is in the position shown at 12. When the blade is in this position, it is imperative that there be obtained a signal which represents this projected blade angle. The mechanical resolver shown schematically as line 16 will be described more fully hereinafter, functions in such a manner that any movement of the blade 12 will cause the wiper arm 55 to move a directly proportional amount as the projected blade angle.

When the blade, for example, is in a new position $12^1$ we see that there is produced a new projected blade angle which is represented by the line A—C, which line is on the plane Y. It is important, therefore, that the change in blade slope be detected and of greatest importance is that the change in the projected blade slope angle be detected. This change in projected blade slope is represented by the angle and it will be noted that the contact arm 55 has now moved to a second position $55^1$ though exactly the same angle that the projected blade slope angle traveled through in the plane Y. The operation of this mechanical feedback transducer comprised of the wiper 55 of the resistant element 56 will be described more fully hereinafter.

A unique feature of this invention is directed to a mechanical means of indicating the true projected angle of the blade cutting edge irrespective of blade location or blade position.

The problem is further complicated by the fact that grader itself may travel along a slope that may vary, and therefore the frame itself has a varying orientation with respect to the V and H axes.

In order to solve the problem of obtaining the true blade cutting angle, a mechanical resolver is coupled to the cutting blade and rotates an actuating member in accordance with the slope of the blade relative to the grader frame. The actuating member is coupled to a rotatable member of a feedback transducer which provides an electrical signal representative of the actual blade slope angle relative to the frame. By comparing this signal with a reference signal representative of the desired cutting angle relative to the grader frame automatic blade control is possible irrespective of grader frame orientation with respect to the true vertical or horizontal.

Detailed Description

Figure 1:
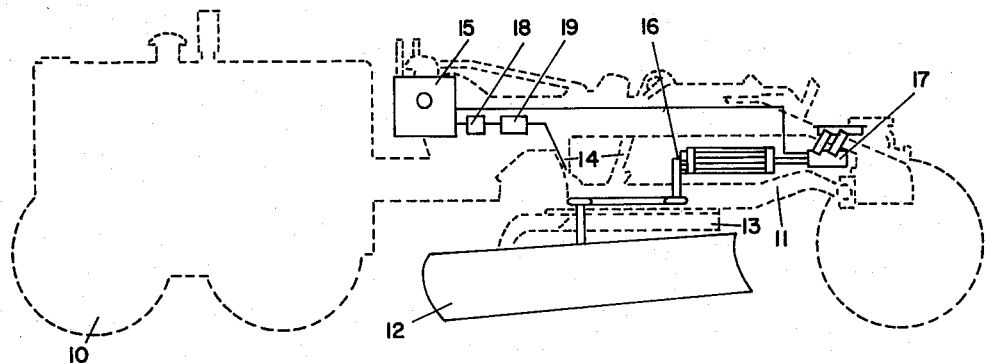

Referring now in detail to the drawing with particular reference to FIG. 1 there is here illustrated a road grader in which an automatic blade slope control system embodying the present invention has been incorporated. The road grader being well known in the art is not shown in detail. It generally consists of a frame 10 to which there is coupled a cutting blade assembly including a universally gimbaled drawbar 11 supporting a cutting blade 12. Attached to the cutting blade is a circular gear 13 coupled through a pinion to a motor (not shown) for rotating the blade relative to the drawbar about an axis in a substantially vertical plane that is normal to its cutting edge. Thus, there is provided a normal axis defining member in the form of circular gear 13. Hydraulic actuator means 14 are provided for orientating the blade relative to the grader frame 10.

Figure 3:
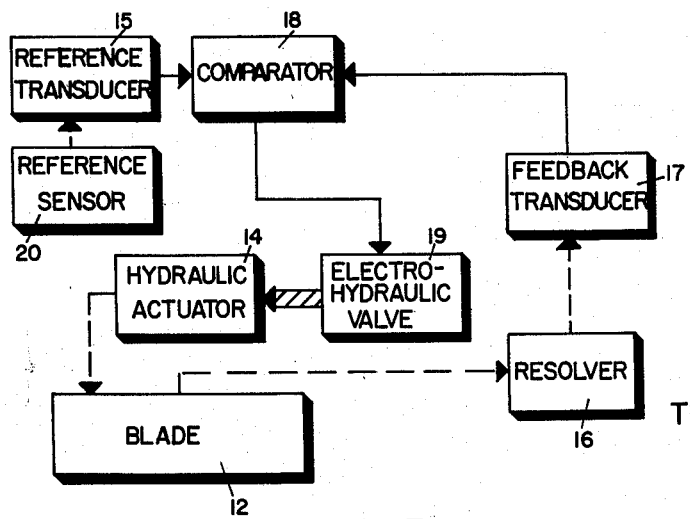
FIG. 3 is a schematic block diagram illustrating the blade control system of this invention.

In the schematic block diagram shown in FIG. 3, electrical transmission is shown by a single line, mechanical transmission by a dash line, and hydraulic transmission by a double line. Referring now to FIGS. 1 and 3, there is provided a reference transducer 15 which is mounted on the grader frame 10 and receives as inputs, true indication of the vertical of the earth from a reference sensor 20, and the desired blade slope angle with respect to true vertical by a manual setting. The output of the reference transducer 15 is an electrical signal representative of the desired slope angle relative to the grader frame. A mechanical resolver 16 disposed between the blade 12 and feedback transducer 17 rotates in accordance with the actual projected blade cutting angle relative to the frame, and is one of the unique features of this invention. A feedback transducer 17 mounted on the grader frame 10 converts the mechanical input of the resolver into an electrical signal. This electrical signal is transmitted to a comparator 18 and, compared with the electrical output signal from the reference transducer 15. The comparator 18 has an output electrical signal representative of the error between the desired cutting angle and the projected cutting angle of the blade. This error signal is transmitted to an electro-hydraulic servo valve 19 whose output flow goes to a hydraulic actuator 14. The actuator moves one end of the blade 13 in the direction to cancel the aforementioned error signal. Thus, the system allows continuous angular control irrespective of blade position relative of the frame, inclination of the frame relative to true vertical, and irrespective of whether the grader is performing ordinary slope grading or banking.

Another serious problem encountered is maintaining a stable control system free of oscillation and capable of achieving desired accuracy and dynamic response. The grader characteristics themselves magnify the problem. Basically, the grader is a mass supported on elastic members. As the blade is positioned to maintain a desired cutting angle it causes a reaction on the frame. The motion of the frame due to the reaction tends to cause the blade to be further repositioned. When a high gain level is required in the closed loop of the servo system, the oscillation of the frame in response to blade motion induces a sustained oscillation of both the blade and frame, making the entire system unstable. Heavy damping of the reference inertial mass tends to reduce this problem, but on the other hand, this heavy damping decreases the accuracy of the system so that under dynamic conditions the time for the reference inertial mass to return to a reference position is increased with the amount of damping. The amount of damping required also increases with the difference between the natural frequency of the reference inertial mass and that of the grader. In the present invention, a pendulum is utilized for vertical reference indication. The system is stabilized with a minimum of pendulum damping by choosing a pendulum whose natural frequency is substantially close to that of the grader. Furthermore, in order to avoid excitation of the pendulum by any other oscillations of the grader the pendulum is located near the transverse axis about which the grader rolls under operating excitations.

Figure 4:
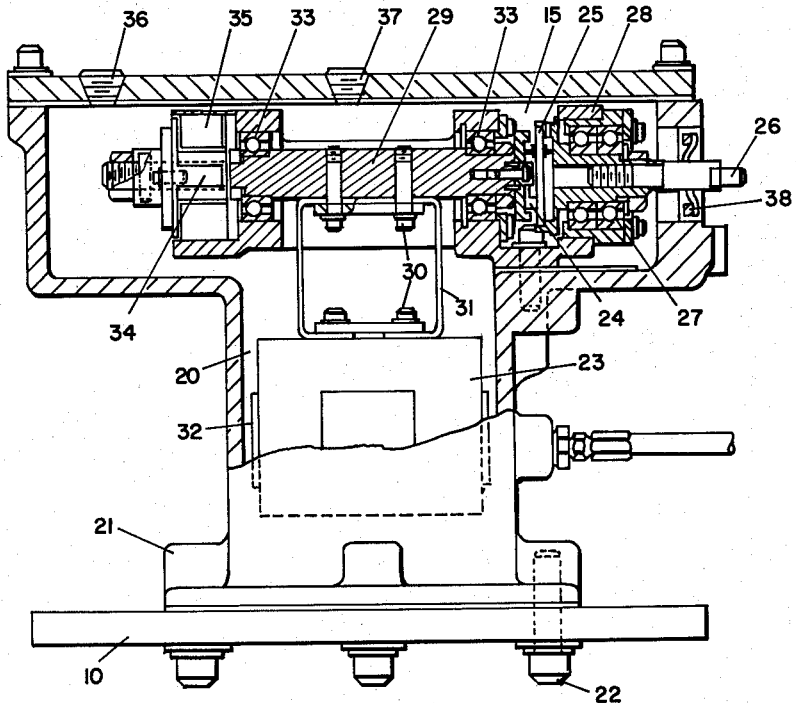
FIG. 4 is a side elevation view, partially in section illustrating the reference sensing device used in the control system of FIG. 3.

Referring now to FIGS. 1 and 4, a housing 21 attached to the grader frame 10 by means of bolts 22 contains the reference sensor 20 and transducer 15. Reference sensor means 20 has an inertial mass 23 for defining a vertical reference axis and is coupled to reference transducer elements 24 and 25 to provide an electrical signal representative of a desired predetermined blade slope angle.

While there are many types of reference transducers that may be used in this type of application such as transformers, potentiometers, etc., the reference transducer will be described in terms of a potentiometer.

The housing 21 is attached to the grader frame by means of bolts 22. An input shaft 26 can be manually rotated in accordance with a desired predetermined blade slope angle. Any conventional means, such as a gear drive may be utilized to couple manual rotative movement to the input shaft 26. Potentiometer resistance element 25 is secured to shaft 26 for rotation therewith, thus providing reference transducer means. The potentiometer may, for example, be of the type manufactured by The Markite Corp. of New York, N.Y., designated as their model type 2094. The shaft 26 is manually rotatable in a pair of ball bearings 22 mounted in a bearing support 28 which is secured to the housing 19.

An inertial mass 23 is suspended from a shaft 29 by bolts 30 and brackets 31 for pivotal movement with the shaft 29 about its axis for defining a vertical reference axis and thus providing reference sensor means. An inertial mass whose weight is approximately 7.8 pounds and whose center of gravity is approximately 4.5 inches from the axis of rotation has been found to be suitable for this application. The axis of rotation of the pendulum is substantially co-incidental with the longitudinal axis about which the grader frame rolls. Brackets 31 are longitudinally resilient for allowing the pendulum to displace longitudinally when subjected to longitudinal shock loads. There is further provided, rubber pads 32 along the faces of the pendulum for absorption of shock loads in the event that the inertial mass 23 strikes the housing 21. The shaft 29 is supported in bearings 33 which in turn are supported by bearing support 28. Affixed to one end of the shaft are two diametrically spaced damping vanes 34 for rotation with the pendulum. Two diametrically spaced stationary damping vanes 35 are secured to bearing support 28 for damping the pendulum as it rotates. The casing is evacuated and filled with damping fluid through the holes 36 and 37 for damping the pendulum. The input shaft is sealed against oil leakage by the end seal 38.

The potentiometer contact arm 24 is affixed to one end of the pendulum shaft 29 for rotation therewith. Contact arm 24 is in sliding contact with resistance element 25. Electric pick-off elements not shown are provided for electrical connection with contact arm 24 and resistance element 25.

Figure 5:
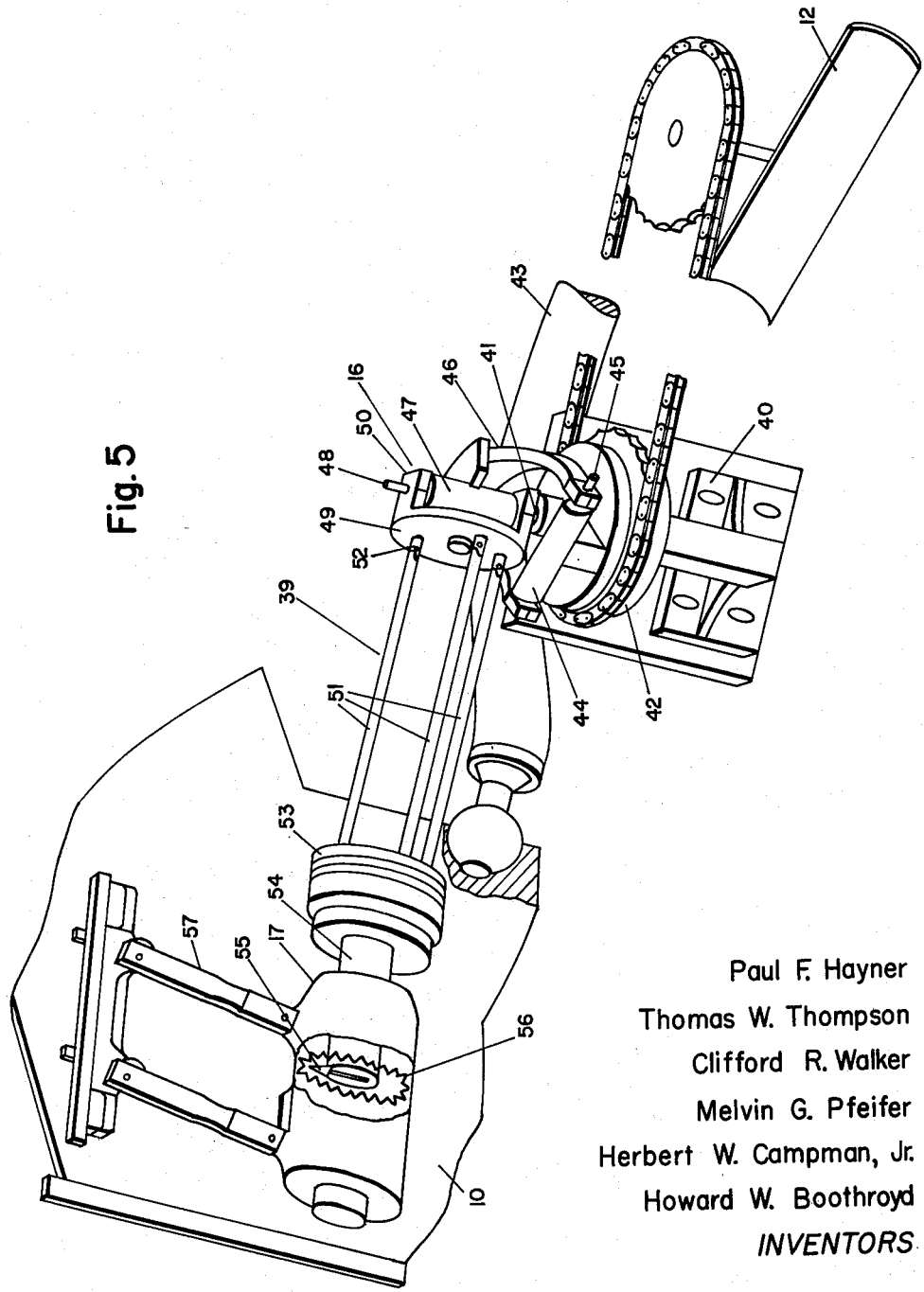
FIG. 5 is an isometric view illustrating a resolver and linkage coupled to the cutting blade.

Referring now to FIG. 5, there is shown a novel feature of the present invention in the resolving means 16 coupling the cutting blade 12 to the rotatable feedback transducer 17 through feedback linkage 39.

As shown in FIG. 5, a bracket 40 is attached to the drawbar 11 for movement therewith. A pin 41 having an axis parallel to the normal axis is affixed to the bracket 40. The term parallel is also intended to include the normal axis depending upon the desired location of the elements in the grader. A driving member 42, for example a sprocket, is mounted on pin 41 for rotation about the pin axis. Driving member 42 is coupled to the cutting blade by chain drive 43 thus there is shown a driving means. A first pivot support including a hollow cylindrical bearing 44 having a centerline perpendicular to the normal axis is affixed to driving member 42 for movement therewith. Thus there is shown a first pivot support means. A pivot pin 45 is disposed within cylindrical bearing 44 with ends protruding therefrom for receiving apertures of an intermediate pivot member including a yoke 46. Yoke 46 is pivotally movable relative to pin 45. Thus we see there is provided intermediate support means. A second pivot support including a hollow cylindrical bearing 47 having a centerline perpendicular to the first pivot support is affixed to yoke 46 for movement therewith and, therefore, provides a second pivot support means. A pin 48 is disposed within bearing 47 with ends protruding therefrom.

An actuating member is shown in FIG. 5. A disc 49 having tabs 50 extending perpendicularly therefrom, is attached to yoke 46 by means of pin 48. The disc 49 is aligned so that a normal to the surface of the disc passing through its center is parallel to the axis of motion of the grader, and is rotatable in a plane perpendicular to the axis of motion of the vehicle. Three space links 51 are connected to disc 49 by means of ball joints 52 on the ends thereof. At opposite ends of space links 51 there is a disc 53 identical to disc 49. The space links are connected to disc 53 by ball joints 52 not shown. Disc 53 is rotatable in a plane parallel to disc 49 in response to the rotation of disc 49. A shaft 52 is keyed to disc 53 for rotation therewith. A contact arm 55 of feedback transducer 17 is affixed to the shaft 59 for rotation therewith. Resistance element 56 is stationary in the respect that it does not rotate with respect to the transducer housing. Thus we see that there are provided actuating means and feedback transducer means.

Although the feedback transducer 17 has been described herein as a potentiometer other transducers may equally be well suited. The feedback transducer 17 is pivotally mounted by brackets 57 to the grader frame 10, and is mounted so that it may move axially and vertically with respect to the grader frame axis of motion.

Figure 6:
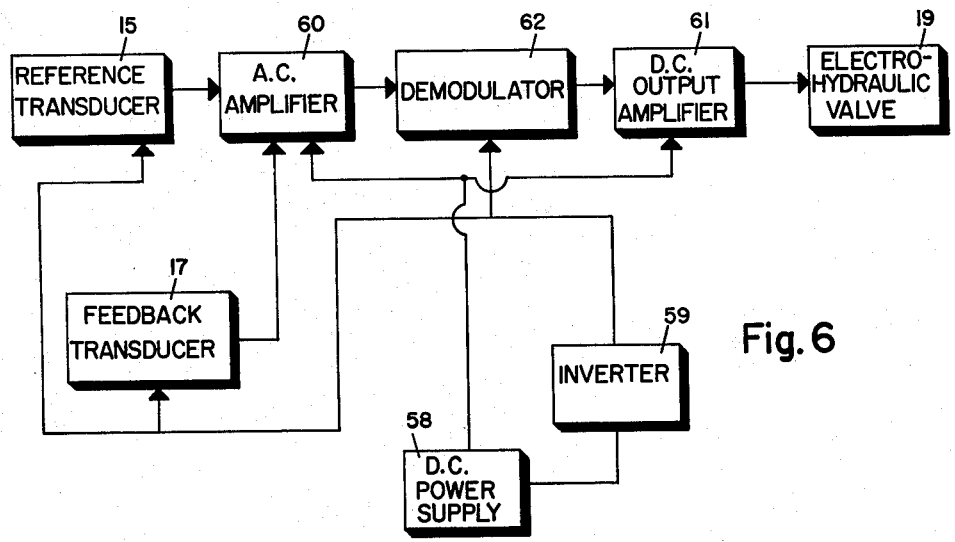
FIG. 6 is a schematic block diagram of the electrical system.

Referring now to FIG. 6, the electrical components of the automatic control system consists of a direct current power supply 58, usually the 12 volt direct current system available on most road graders, which is fed to an inverter 59, an A.C. amplifier 60 and a D.C. amplifier 61. From the inverter the A.C. signal is transmitted to an electrical bridge circuit between the feedback transducer 17 and reference transducer 15 which provide a comparator means. The output of this electrical bridge circuit is transmitted to an alternating current amplifier 60, is demodulated in the demodulator 62 and transmitted to a direct current amplifier 61 whose output signal is transmitted to an electro-hydraulic servo valve 19.

Figure 7:
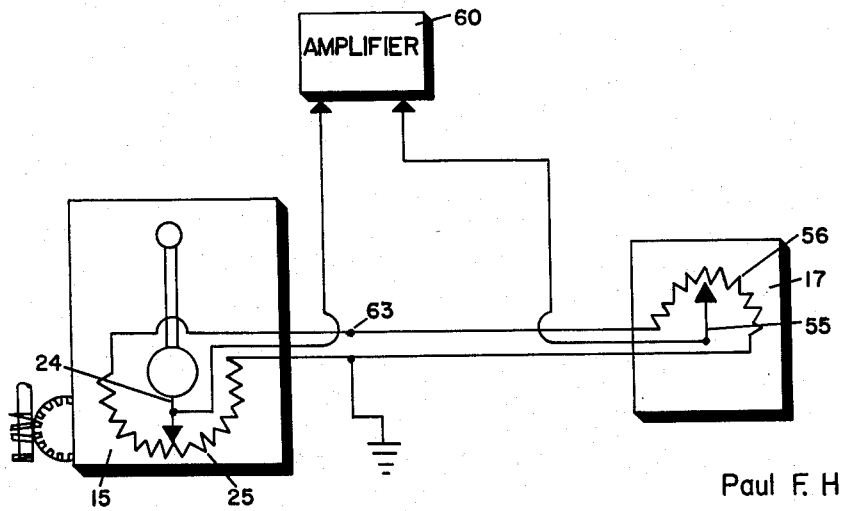
FIG. 7 is a schematic diagram illustrating the comparator circuit used in the control system of FIG. 3.

FIG. 7 is a schematic of the electrical bridge circuit between the reference transducers and feedback transducer 17. The resistance element 25 of the reference transducer 15 is connected in parallel with the resistance element 56 of feedback transducer 17 between points 63 and ground. An alternating current voltage is supplied from the inverter 59 (shown in FIG. 6) between points 63 and ground in the circuit. Any error existing between the desired cutting angle and actual cutting angle will appear as a voltage unbalance in the bridge circuit between the reference transducer contact arm 24 and feedback transducer contact arm 55. This voltage unbalance or error signal is picked off and fed to amplifier 60 for transmission to servo-valve 19. The servo valve operates to correct the blade angle thereby balancing the voltage and cancelling the error signal.

*Operation*

Referring now to FIG. 4, the operator selects a desired cutting angle by rotating shaft 26 which in turn rotates resistance element 25. The inertial mass 23 always indicates true vertical and positions the contact arm 24 of the reference potentiometer 15 in a vertical direction. As the grader frame 10 rotates with respect to true vertical, the relative positions of resistance element 25 and contact arm 24 changes. The reference potentiometer 15 has an output voltage proportional to the operator's selected angle relative to true vertical less the angle of the frame relative to true vertical. Expressed another way, the output voltage is proportional to the desired angle relative to the frame 10. This output voltage is a command signal to the angular positioning mechanism.

The cutting angle of the blade 12 relative to the frame 10 is derived by a mechanical resolver 16 whose operation will be described hereinafter. The resolver 16 and linkage 39 rotate the contact arm 55 of the feedback potentiometer 17 in proportion to the projected cutting angle of the blade relative to the frame. In the electrical bridge circuit shown schematically in FIG. 7, the output voltage of the feedback potentiometer 17 (projected cutting angle relative to the frame) is compared to the output voltage of the reference potentiometer 15 (desired cutting angle relative to the frame). The output voltage of this electrical bridge is an error signal which is fed to the amplifier 60. The amplified error signal is converted and transmitted to an electro-hydraulic servo valve 19 whose output flow is proportional to the error signal and which operates a hydraulic actuator for repositioning the blade in direction and magnitude to balance the electrical bridge circuit (thus cancelling the error signal). Thus, the resulting cutting angle of the blade relative to the vertical is equal to the operator's selected angle relative to the vertical as measured by the inertial mass.

The operation of the resolver, space linkage and feedback potentiometer will be explained with reference to FIG. 1 and FIG. 5. As the blade rotates about a normal to its cutting edge, a chain drive rotates a sprocket 42. The direction and magnitude of rotation of sprocket 42 is equal to the rotation of the blade in the plane formed by its cutting edge as it rotates.

For purposes of explanation, we will first describe the operation of the resolver if the blade were aligned so that a normal to its cutting edge would be parallel to a transverse plane through the grader frame. As the blade 12 is rotated by gear 13 sprocket 42 rotates, rotating yoke 46 through pin 45. Yoke 46 pivots about pin 48, and disc 49 does not rotate. Disc 49 is constrained by the feedback linkage 39 so that its plane of rotation is always parallel to a plane transverse to the axis of motion of the grader. Therefore, pin 48 would be aligned so that its rotation in the tabs 50 would impart no rotation to disc 49. It should be noted that, as the blade rotates in this position, there is no change in the desired projected cutting angle.

As the normal axis of the blade is rotated in a plane transverse to the axis of motion of the grader, the bracket 40 which is affixed to drawbar 11 would be similarly tilted. Sprocket 42 and bearing 44 would be tilted in a like manner. Pin 45 in bearing 44 would tilt yoke 46 and rotate disc 49 through pins 48. Disc 53 would be rotated by feedback links 51 in the same magnitude and direction. The shaft 54 would rotate contact arm 55 relative to resistor element 56 of the feedback transducer 17.

Assume now that the normal axis of the blade was rotated in the direction of motion and the blade then rotated about its normal axis. Once again bracket 40 and sprocket 42 would be tilted in the same manner as the blade. When the brackets are in this position, the axis of rotation of pin 48 and pin 41 would not be parallel. As sprocket 42 rotates, it rotates bearing 44 which rotates pin 45, yoke 46, bearing 47, and pin 48. Since pin 48 is constrained to rotate in the same plane as disc 49, a cranking action takes place between pins 48 and tabs 50, thus rotating disc 49. The net combination of all rotations of disc 49 is proportional to the actual projected blade cutting angle relative to the grader frame.

As the draw bar 11 to which the blade is attached changes position relative to the frame, discs 49 and 53 change their relative positions but are maintained parallel to each other in a plane transverse to the direction of grader travel. This is accomplished by use of gimbaled feedback links 51 connecting discs 49 and 59, and by pivotal movement of feedback transducer 16 in the plane of grader travel.

The operation of the electrical system will be described as utilizing a 12 volt battery direct current source, which is common in road graders. However, the system can be modified to accommodate any commonly utilized electrical source.

Figure 8:
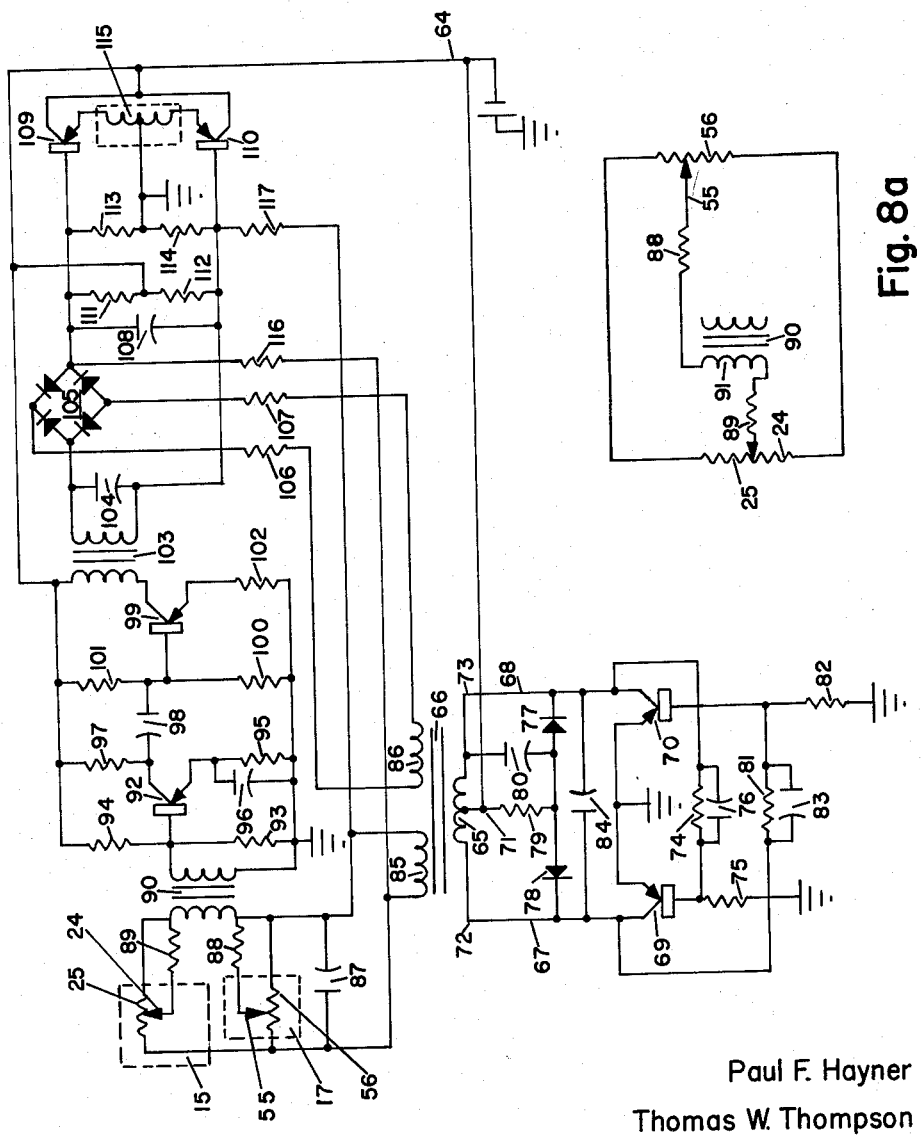

The positive terminal of the battery is connected to ground and the negative terminal is connected to conductor 64 in FIG. 8. Negative 12 volts is applied to the center tap 65 of transformer 66. This negative voltage is applied to the collector leads 67 and 68 of transistors 69 and 70. For purposes of explaining the circuit operation, assume that transistor 70 is full "on" and ready to switch "off". The current in conductor 68 is now constant and the rate of change of flux in the transformer 66 is zero. At this time the voltage in conductor 68 is only slightly negative relative to ground and the voltage in conductor 67 is highly negative relative to ground. When the rate of change in flux is zero, the magnetic field around the transformer 66 starts to collapse inducing a voltage between points 71 and 73 of transformer 66 which tends to make point 73 become more negative with respect to ground. As point 73 becomes negative, the voltage applied to the base of transistor 69 becomes negative. This is accomplished by the feedback network of resistors 74 and 75 and capacitor 76. The capacitor 76 allows a steep switching wave front to be applied quickly to the base of transistor 69. The negative voltage at the base of 69 turns the transistor 69 "on" even harder causing more current to flow between points 71 and 72 causing a rate of change in flux in the transformer 66. This flux change induces more voltage between 71 and 73 causing point 73 to become more negative thus increasing the feedback through resistors 74 and 75. It is possible to induce a voltage between 71 and 73 greater than the 12 volts supplied to the circuit. Diodes 77 and 78 are clamped to the supply voltage by resistor 79 and capacitor 80, which allows fast surges. These diodes clamp the voltages at 72 or 73 whenever the induced voltage 72—71 or 71—73 tries to rise above the 12 volt supply voltage.

The current flow between points 71 and 72 increases with the feedback to the base of transistor 69 through resistors 74 and 75 as long as the transformer 66 does not become saturated. When the transformer 66 saturates the rate of change of flux between 71 and 72 goes to zero causing the magnetic field in 66 to collapse and induce a voltage in the opposite direction. At this time, point 72 which was slightly negative as current flowed, begins to become highly negative causing a positive feedback to be applied to the base of transistor 70, through resistors 81 and 82 and capacitor 83. This positive feedback turns transistor 70 "on" causing point 73 to reduce from highly negative voltage to slightly negative voltage.

This positive going feedback voltage is applied to the base of transistor 69 as before, tending to turn 69 "off". As 69 goes "off", 72 begins becoming highly negative and the rate of change of flux due to current flow between 71 and 73 causes the voltage to try to exceed −12 volts. Diode 77 clamps the voltage to −12 volts as before. Point 73 is becoming less negative as 70 goes "on" and 69 goes "off".

If the voltage of 72 and 73 is observed with respect to ground, it will be seen to flip back and forth between −12 volts and almost 0 volts. The opposing collector 68 or 67 will flip from 0 to −12 volts. The wave shape is square and the frequency of oscillation is dependent upon the saturation characteristics of the transformer 66, the number of turns of the primary 72—73, and the supply voltage of −12 volts.

The square wave frequency output of the magnetically saturating "flip-flop" is 400 cycles.

Capacitor 84 is added to the primary of the transformer 66 to maintain the squareness of the waveform and minimize the leakage inductance effects of the transformer.

Square wave voltage outputs are obtained from the transformer 66 by means of windings 85 and 86. Capacitor 87 keeps the output voltage of winding 85 as square as possible. Winding 85 supplies the signal voltage necessary for the amplifier, to the transducer elements 56 and 25. The amount of signal obtained from the transducers 15 and 17 depends upon the position of the variable contact arms 55 and 24 of the transducers. The transducers 15 and 17 along with resistors 88 and 89 form a bridge network of which the primary of the transformer 90 is the load. FIG. 8a shows the bridge circuit when it is in the unbalanced state. At balance the two variable arms 24 and 55 in the transducers 15 and 17 are directly opposite one another or i.e. set at the same potential point on the potentiometers. In the unbalanced case, current flows through resistors 88 and 89 and the transformer primary 91, which is a square wave signal whose magnitude, depends upon the difference in voltage between the variable arms of the transducers 15 and 17. This voltage also has a phase angle reference of 0° or 180° in respect to the voltage present on winding 86 of the transformer 66. The phase at 91 will be 0° or 180° depending upon which way the current flows through the transformer 90. The direction of current flow is determined by which arm on the transducers is more positive with respect to the voltage across the winding 86 on the transformer 66.

The resistors 88 and 89 provide overload current protection to the variable contact arms 24 and 55. In the extreme unbalanced case it would be possible to draw a significant current from the sensor arms through the transformer primary 91. The resistors prevent the current from exceeding the ratings of the transducer arms.

Figure 9:
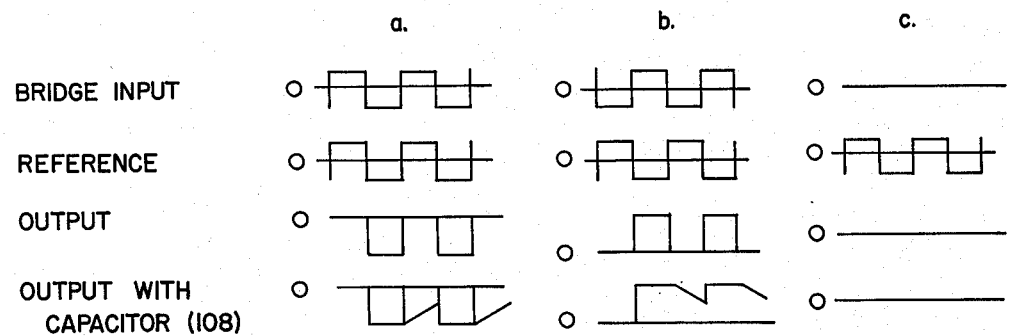
FIG. 9 is a series of voltage wave form graphs illustrating the operation of the electrical circuit of FIG. 8.

From the secondary of the transformer 90, the voltage is fed into the base connection of transistor 92. Transformer 90 provides an impedance match between the transducer bridge and the transistor amplifier as well as providing a means of going from a double ended circuit (the bridge) to a single ended circuit (the transistor). Resistors 93 and 94 provide direct current bias to the base of transistor 92. Resistor 95 is also a transistor biasing resistor and with resistors 93 and 94 provides direct current to transistor 92, and further provide temperature stability to its operation. Capacitor 96 is used to minimize the degenerative effects of resistors 95 upon alternating current signals. Without capacitor 96, the gain at transistor 92 would be low. Resistor 97 acts as the collector load resistor for transistor 92 and provides direct current to the collector. The amplified signal from transistor 92 is obtained at the junction of resistor 97 and the collector of transistor 92 with respect to ground. Capacitor 98 couples the alternating current signal to the base of transistor 99 while preventing the previous collector's direct current voltage from biasing the base of transistor 99. Resistors 100, 101, and 102 are direct current biasing resistors and also supply a degree of temperature stability to transistors 99. The output voltage of transistor 99 is supplied to the primary of transformer 103. Transformer 103 allows an impedance match from the transistor amplifier 99 to the output stages. The transformer also allows the designer to proceed from a single ended circuit to a double ended "push-pull" output circuit. Capacitor 104 is used to maintain the square shape of the signal supplied by the amplifier. The output voltage of the input amplifier is supplied to a half wave diode bridge 105 to be demodulated to a direct current voltage to drive the output stages. Reference voltage for the demodulator is supplied by winding 86 of transformer 66 through resistors 106 and 107, which limit the reference current through the bridge 105. The direct current output of the diode is either negative, positive or zero in respect to ground as shown by the phase relationships in FIG. 9. The degree to which the voltage is positive or negative depends entirely upon the amplitude of the signal supplied by transformer 103 to the bridge. FIG. 9 shows the output of the bridge with respect to ground and the effect of capacitor 108 on the output.

Capacitor 108 is essentially a filter capacitor to smooth the direct current pulsations as shown in FIG. 9b, and to apply a smooth bias current to transistors 109 and 110. Resistors 111, 112, 113 and 114 are direct current bias resistors for transistors 109 and 110. These transistors are biased "Class A" so that equal and opposite currents are drawn through each half of an electrohydraulic servo valve force motor.

When there is zero signal at the diode bridge 105 the transistor 109 and 110 are operating quiescently and drawing equal and opposite currents through the force motor 115. This causes no over all magnetic field to be generated by the force motor and therefore no force is exerted on the output servo valve which is part of the force motor 115. When a signal is applied as in FIG. 9a, transistor 109 is caused to conduct more heavily and transistor 110 conducts less heavily thereby creating on overall magnetic field to be generated in the force motor 115 of valve 19 (not shown). This field causes the servo valve to move in such a direction as to cause the feedback transducer contact arm 55 to move in a direction to balance the bridge of FIG. 8a, and cause no signal to appear at the output of diode bridge 105. When an error signal such as that shown in FIG. 9b is received transistor 110 conducts heavily while transistor 109 is caused to conduct less. This net change in current causes the force motor 115 to move the servo valve in a direction so that contact arm 55 balances the bridge network shown in FIG. 8a. When the bridge is balanced no signal appears at the output of diode bridge 105, as shown in FIG. 9c. Thus, by means of the input bridge, the amplifier, and the servo valve a closed loop system is attained whereby any error caused by motion of the road grader is immediately translated into a corrective force on the road grader blade. A servo valve of the type manufactured by Sanders Associates, Inc. of Nashua, New Hampshire, and designated as their Model SA-24 has been found to be suitable in this application. The blade is controlled by the servo valve and its position is set by the reference potentiometer 15. Any error due to grader motion is always corrected for by feedback transducer 17 being moved in such a direction by the servo valve action on the blade as to cause the system to remain in balance. Thus, the blade is continuously maintained at the desired predetermined slope angle.

An additional square wave signal from winding 85 of transformer 66 is transmitted to the bases of transistors 109 and 110 through resistors 116 and 117. This square wave signal is of a predetermined amplitude set by the resistance values of 116 and 117. This signal is termed "dither." "Dither" is used to cause the force motor 115 to vibrate the servo valve slightly at a 400 cycle per second rate. Vibrating the servo valve serves the purpose of overcoming the static friction of the servo valve when it is at a null position. Thus, when an error signal is received the valve will respond immediately to the signal. There will be no delay in its response to static friction.

While it has hereinbefore described what is, at present considered, a preferred embodiment of the present invention, it will be apparent to those skilled in the art that many and various changes and modifications may be made therein without departing from the spirit of the invention, and it will be understood that all and any such changes and modifications which fall fairly within the scope of this invention as defined in the appended claims are to be considered as a part of the invention.

What is claimed is:

1. An automatic blade slope control system for use in a vehicle for road grading including a vehicle frame, a cutting blade assembly coupled to said frame a cutting blade coupled to said assembly and rotatable about an axis normal to its cutting edge, means for rotating said cutting blade about a normal axis defining member, said cutting blade and said normal axis member being rotatable relative to a plane perpendicular to the axis of motion of said vehicle, means for rotating said cutting blade and normal axis member, and hydraulic means for controlling orientation of said cutting blade, comprising: reference sensor means having an inertial mass for defining a vertical reference axis; reference transducer means coupled to said reference sensor means for producing a reference electrical signal representative of a desired predetermined blade slope angle; resolving means coupling said cutting blade and a feedback transducer means, said resolving means including driving means coupled to said blade and having a member rotatable about an axis parallel to said normal axis member and a first pivot support means affixed thereto for providing a pivot support axis perpendicular to said normal axis member, intermediate pivot means pivotally coupled to said pivot support means for relative pivotal motion about said pivot support axis and having second pivot support means affixed thereto for providing a second pivot support axis perpendicular to said first pivot support axis, and an actuating means having a member coupled to said feedback transducer means, said actuator means being pivotally coupled to said support means for relative pivotal motion about said second support axis whereby said actuating means is rotated only in accordance with the rotation of said normal axis member in a plane perpendicular to the axis of motion of said vehicle; feedback transducer means having a rotatable member coupled to said actuating means for producing a feedback electrical signal representative of the projected angle of said normal axis defining member relative to said frame in a plane perpendicular to the axis of motion of said vehicle; comparator means coupled to said reference and feedback transducer means for producing an error signal in accordance with the algebraic sum of said reference and feedback signals; and electro-hydraulic valve means coupled to said hydraulic means and responsive to said error signal for continuously controlling the orientation of said cutting blade at said desired predetermined blade slope angle.

2. An automatic blade slope control system for use in a vehicle for road grading including a vehicle frame, a cutting blade assembly coupled to said frame, a cutting blade coupled to said assembly and rotatable about an axis normal to its cutting edge, means for rotating said cutting blade about a normal axis defining member, said cutting blade and said normal axis member being rotatable relative to a plane perpendicular to the axis of motion of said vehicle, means for rotating said cutting blade and normal axis member, and hydraulic means for controlling orientation of said cutting blade, comprising: reference sensor means having an inertial mass pivotal about an axis for defining a vertical reference axis; reference transducer means coupled to said reference sensor means for producing a reference electrical signal representative of a desired predetermined blade slope angle; resolving means coupling said cutting blade and a feedback transducer means, said resolving means including driving means coupled to said blade and having a member rotatable about an axis parallel to said normal axis member and a first pivot support means affixed thereto for providing a pivot support axis perpendicular to said normal axis member, intermediate pivot means pivotally coupled to said pivot support means for relative pivotal motion about said pivot support axis and having second pivot support means affixed thereto for providing a second pivot support axis perpendicular to said first pivot support axis, and an actuating means having a member coupled to said feedback transducer means, said actuator means being pivotally coupled to said support means for relative pivotal motion about said second support axis whereby said actuating means is rotated only in accordance with the rotation of said normal axis member in a plane perpendicular to the axis of motion of said vehicle; feedback transducer means having a rotatable member coupled to said actuating means for producing a feedback electrical signal representative of the projected angle of said normal axis defining member relative to said frame in a plane perpendicular to the axis of motion of said vehicle; comparator means coupled to said reference and feedback transducer means for producing an error signal in accordance with the algebraic sum of said reference and feedback signals; and electro-hydraulic valve means coupled to said hydraulic means and responsive to said error signal for continuously controlling the orientation of said cutting blade at said desired predetermined blade slope angle.

3. An automatic blade slope control system for use in a vehicle for road grading including a vehicle frame, a cutting blade assembly coupled to said frame, a cutting blade coupled to said assembly and rotatable about an axis normal to its cutting edge, means for rotating said cutting blade about a normal axis defining member, said cutting blade and said normal axis member being rotatable relative to a plane perpendicular to the axis of motion of said vehicle, means for rotating said cutting blade and normal axis member, and hydraulic means for controlling orientation of said cutting blade, comprising: reference sensor means having an inertial mass for defining a vertical reference axis; reference transducer means, having an element coupled to said reference sensor means, and a second element position adjustable relative to said vehicle frame and movable therewith in normal operation for producing a reference electrical signal proportional to the relative positions of said reference sensor and transducer means and representative of a desired predetermined blade slope angle; resolving means coupling said cutting blade and a feedback transducer means, said resolving means including driving means coupled to said blade and having a member rotatable about an axis parallel to said normal axis member and a first pivot support means affixed thereto for providing a pivot support axis perpendicular to said normal axis member intermediate pivot means pivotally coupled to said pivot support means for relative pivotal motion about said pivot support axis and having second pivot support means affixed thereto for providing a second pivot support axis perpendicular to said first pivot support axis, and an actuating means having a member coupled to said feedback transducer means, said actuator means being pivotally coupled to said support means for relative pivotal motion about said second support axis whereby said actuating means is rotated only in accordance with the rotation of said normal axis member in a plane perpendicular to the axis of motion of said vehicle; feedback transducer means having a rotatable member coupled to said actuating means for producing a feedback electrical signal representative of the projected angle of said normal axis defining member relative to said frame in a plane perpendicular to the axis of motion of said vehicle; comparator means coupled to said reference and feedback transducer means for producing an error signal in accordance with the algebraic sum of said reference and feedback signals; and electro-hydraulic valve means coupled to said hydraulic means and responsive to said error signal for continuously controlling the orientation of said cutting blade at said desired predetermined blade slope angle.

4. An automatic blade slope control system for use in a vehicle for road grading including a vehicle frame, a cutting blade assembly coupled to said frame, a cutting blade coupled to said assembly and rotatable about an axis normal to its cutting edge, means for rotating said cutting blade about a normal axis defining member, said cutting blade and said normal axis member being rotatable relative to a plane perpendicular to the axis of motion of said vehicle, means for rotating said cutting blade and normal axis member, and hydraulic means for controlling orientation of said cutting blade, comprising: reference sensor means having an intertial mass for defining a vertical reference axis; reference transducer means coupled to said reference sensor means for producing a reference electrical signal representative of a desired predetermined blade slope angle; resolving means coupling said cutting blade and a feedback transducer means, said resolving means including driving means coupled to said blade and having a member rotatable about an axis parallel to said normal axis member and a first pivot support means affixed thereto for providing a pivot support axis perpendicular to said normal axis member, intermediate pivot means pivotally coupled to said pivot support means for relative pivotal motion about said pivot support axis and having second pivot support means affixed thereto for providing a second pivot support axis perpendicular to said first pivot support axis, and an actuating means having a member coupled to said feedback transducer means, said actuator means being pivotally coupled to said support means for relative pivotal motion about said second support axis whereby said actuating means is rotated only in accordance with the rotation of said normal axis member in a plane perpendicular to the axis of motion of said vehicle; feedback potentiometer means having a rotatable member coupled to said actuating means for producing a feedback electrical signal representative of the projected angle of said normal axis defining member relative to said frame in a plane perpendicular to the axis of motion of said velocity; comparator means coupled to said reference transducer and feedback potentiometer means for producing an error signal in accordance with the algebraic sum of said reference and feedback signals; and electro-hydraulic valve means coupled to said hydraulic means and responsive to said error signal for continuously controlling the orientation of said cutting blade at said desired predetermined blade slope angle.

5. An automatic blade slope control system for use in a vehicle for road grading including a vehicle frame, a cutting blade assembly coupled to said frame, a cutting blade coupled to said assembly and rotatable about an axis normal to its cutting edge, means for rotating said cutting blade about a normal axis defining member, said cutting blade and said normal axis member being rotatable relative to a plane perpendicular to the axis of motion of said vehicle, means for rotating said cutting blade and normal axis member, and hydraulic means for controlling orientation of said cutting blade, comprising: reference sensor means having an inertial mass for defining a vertical reference axis; reference transducer means coupled to said reference sensor means for producing a reference electrical signal representative of a desired predetermined blade slope angle; resolving means coupling said cutting blade and a feedback transducer means, said resolving means including driving means coupled to said blade and having a member rotatable about an axis parallel to said normal axis member and a first pivot support means affixed thereto for providing a pivot support axis perpendicular to said normal axis member, intermediate pivot means pivotally coupled to said pivot support means for relative pivotal motion about said pivot support axis and having second pivot support means affixed thereto for providing a second pivot support axis perpendicular to said first pivot support axis, and an actuating means having a member coupled to said feedback transducer means, said actuator means being pivotally coupled to said support means for relative pivotal motion about said second support axis whereby said actuating means is rotated only in accordance with the rotation of said normal axis member in a plane perpendicular to the axis of motion of said vehicle; feedback transducer means having a rotatable member coupled to said actuating means for producing a feedback electrical signal representative of the projected angle of said normal axis defining member relative to said frame in a plane perpendicular to the axis of motion of said vehicle; said reference and feedback transducers having their elements connected in an electrical bridge circuit for producing a voltage unbalance error signal in accordance with the algebraic sum of said reference and feedback signals; and electro-hydraulic valve means coupled to said hydraulic means and responsive to said error signal for continuously controlling the orientation of said cutting blade at said desired predetermined blade slope angle.

6. An automatic blade slope control system for use in a vehicle for road grading including a vehicle frame, cutting blade assembly coupled to said frame, a cutting blade coupled to said assembly and rotatable about an axis normal to its cutting edge, means for rotating said cutting blade about a normal axis defining member, said cutting blade and said normal axis member being rotatable relative to a plane perpendicular to the axis of motion of said vehicle, means for rotating said cutting blade and normal axis member, and hydraulic means for controlling orientation of said cutting blade, comprising: reference sensor means having an inertial mass for defining a vertical reference axis; reference transducer means coupled to said reference sensor means for producing a reference electrical signal representative of a desired predetermined blade slope angle; resolving means coupling said cutting blade and a feedback transducer means, said resolving means including driving means coupled to said blade and having a member rotatable about an axis parallel to said normal axis member and a first pivot support means affixed thereto for providing a pivot support axis perpendicular to said normal axis member, intermediate pivot means pivotally coupled to said pivot support means for relative pivotal motion about said pivot support axis and having second pivot support means affixed thereto for providing a second pivot support axis perpendicular to said first pivot support axis, and an actuating means having a member coupled to said feedback transducer means, said actuator means being pivotally coupled to said support means for relative pivotal motion about said second support axis whereby said actuating means is rotated only in accordance with the rotation of said normal axis member in a plane perpendicular to the axis of motion of said vehicle; said actuating means having a first rotatable member coupled to said intermediate pivot means, a second rotatable member coupled to said feedback transducer means and linkage means coupling said first and second rotatable members for constraining said members for rotation about an axis parallel to the direction of travel of said vehicle; feedback transducer means having a rotatable member coupled to said actuating means second rotatable member for producing a feedback electrical signal representative of the projected angle of said normal axis defining member relative to said frame in a plane perpendicular to the axis of motion of said vehicle; comparator means coupled to said reference and feedback transducer means for producing an error signal in accordance with the algebraic sum of said reference and feedback signals; and electro-hydraulic valve means coupled to said hydraulic means and responsive to said error signal for continuously controlling the orientation of said cutting blade at said desired predetermined blade slope angle.

7. An automatic blade slope control system for use in a vehicle for road grading including a vehicle frame, a cutting blade assembly coupled to said frame, a cutting blade coupled to said assembly and rotatable about an axis normal to its cutting edge, means for rotating said cutting blade about a normal axis defining member, said cutting blade and said normal axis member being rotatable relative to a plane perpendicular to the axis of motion of said vehicle, means for rotating said cutting blade and normal axis member, and hydraulic means for controlling orientation of said cutting blade, comprising: reference sensor means having an inertial mass for defining a vertical reference axis; reference transducer means coupled to said reference sensor means for producing a reference electrical signal representative of a desired predetermined blade slope angle; resolving means coupling said cutting blade and a feedback transducer means, said resolving means including driving means coupled to said blade and having a member rotatable about an axis parallel to said normal axis member and a first pivot support means affixed thereto for providing a pivot support axis perpendicular to said normal axis member, intermediate pivot means pivotally coupled to said pivot support means for relative pivotal motion about said pivot support axis and having second pivot support means affixed thereto for providing a second pivot support axis perpendicular to said first pivot support axis, and an actuating means having a member coupled to said feedback transducer means, said actuator means being pivotally coupled to said support means for relative pivotal motion about said second support axis whereby said actuating means is rotated only in accordance with the rotation of said normal axis member in a plane perpendicular to the axis of motion of said vehicle; feedback transducer means having a rotatable member coupled to said actuating means for producing a feedback electrical signal representative of the projected angle of said normal axis defining member relative to said frame in a plane perpendicular to the axis of motion of said vehicle; comparator means coupled to said reference and feedback transducer means for producing an error signal in accordance with the algebraic sum of said reference and feedback signals; and electro-hydraulic valve means for varying the flow of fluid to said hydraulic means in response to said error signal for continuously controlling the orientation of said cutting blade at said desired predetermined blade slope angle.

8. An automatic blade slope control system for use in a vehicle for road grading including a vehicle frame, a cutting blade assembly coupled to said frame, a cutting blade coupled to said assembly and rotatable about an axis normal to its cutting edge, means for rotating said cutting blade about a normal axis defining member, said cutting blade and said normal axis member being rotatable relative to a plane perpendicular to the axis of motion of said vehicle, means for rotating said cutting blade and normal axis member, and hydraulic means for controlling orientation of said cutting blade, comprising: reference sensor means having an inertial mass for defining a vertical reference axis; reference electrical signal representative of a desired predetermined blade slope angle; resolving means coupling said cutting blade and feedback transducer means, said resolving means including a pin affixed to said cutting blade assembly having an axis parallel to said normal axis defining member, driving means coupled to said blade and having a member rotatable about said pin axis, and a first pivot support means affixed thereto for providing a pivot support axis perpendicular to said normal axis member, intermediate pivot means pivotally coupled to said pivot support means for relative pivotal motion about said pivot support axis and having second pivot support means affixed thereto for providing a second pivot support axis perpendicular to said first pivot support axis, and an actuating means having a member coupled to said feedback transducer means, said actuator means being pivotally coupled to said support means for relative pivotal motion about said second support axis whereby said actuating means is rotated only in accordance with the rotation of said normal axis member in a plane perpendicular to the axis of motion of said vehicle; feedback transducer means having a rotatable member coupled to said actuating means for producing a feedback electrical signal representative of the projected angle of said normal axis defining member relative to said frame in a plane perpendicular to the axis of motion of said vehicle; comparator means coupled to said reference and feedback transducer means for producing an error signal in accordance with the algebraic sum of said reference and feedback signals; and electro-hydraulic valve means coupled to said hydraulic means and responsive to said error signal for continuously controlling the orientation of said cutting blade at said desired predetermined blade slope angle.

9. An automatic blade slope control system for use in a vehicle for road grading including a vehicle frame, a cutting blade assembly coupled to said frame, a cutting blade coupled to said assembly and rotatable about an axis normal to its cutting edge, means for rotating said cutting blade about a normal axis defining member, said cutting blade and said normal axis member being rotatable relative to a plane perpendicular to the axis of motion of said vehicle, means for rotating said cutting blade and normal axis member, and hydraulic means for controlling orientation of said cutting blade, comprising:

reference sensor means having an inertial mass pivotal about an axis for defining a vertical reference axis; reference transducer means having an element coupled to said reference sensor means, and a second element position adjustable relative to said vehicle frame and movable therewith in normal operation for producing a reference electrical signal proportional to the relative positions of said reference sensor and transducer means and representative of a desired predetermined blade slope angle; resolving means coupling said cutting blade and a feedback transducer means, said resolving means including driving means coupled to said blade and having a member rotatable about an axis parallel to said normal axis member and a first pivot support means affixed thereto for providing a pivot support axis and perpendicular to said normal axis member, intermediate pivot means pivotally coupled to said pivot support means for relative pivotal motion about said pivot support axis and having second pivot support means affixed thereto for providing a second pivot support axis perpendicular to said first pivot support axis, and an actuating means having a member coupled to said feedback transducer means, said actuator means being pivotally coupled to said support means for relative pivotal motion about said second support axis whereby said actuating means is rotated only in accordance with the rotation of said normal axis member in a plane perpendicular to the axis of motion of said vehicle; feedback transducer means having a rotatable member coupled to said actuating means for producing a feedback electrical signal representative of the projected angle of said normal axis defining member relative to said frame in a plane perpendicular to the axis of motion of said vehicle; comparator means coupled to said reference and feedback transducer means for producing an error signal in accordance with the algebraic sum of said reference and feedback signals; and electro-hydraulic valve means coupled to said hydraulic means and responsive to said error signal for continuously controlling the orientation of said cutting blade at said desired predetermined blade slope angle.

10. An automatic blade slope control system for use in a vehicle for road grading including a vehicle frame, a cutting blade assembly coupled to said frame, a cutting blade coupled to said assembly and rotatable about an axis normal to its cutting edge, means for rotating said cutting blade about a normal axis defining member, said cutting blade and said normal axis member being rotatable relative to a plane perpendicular to the axis of motion of said vehicle, means for rotating said cutting blade and normal axis member, and hydraulic means for controlling orientation of said cutting blade, comprising: reference sensor means having an inertial mass for defining a vertical reference axis; reference transducer means, having an element coupled to said reference sensor means, and a second element position adjustable relative to said vehicle frame and movable therewith in normal operation for producing a reference electrical signal proportional to the relative positions of said reference sensor and transducer means and representative of a desired predetermined blade slope angle; resolving means coupling said cutting blade and a feedback transducer means, said resolving means including driving means coupled to said blade and having a member rotatable about an axis parallel to said normal axis member and a first pivot support means affixed thereto for providing a pivot support axis perpendicular to said normal axis member, intermediate pivot means pivotally coupled to said pivot support means for relative pivotal motion about said pivot support axis and having second pivot support means affixed thereto for providing a second pivot support axis perpendicular to said first pivot support axis, and an actuating means having a member coupled to said feedback transducer means, said actuator means being pivotally coupled to said support means for relative pivotal motion about said second support axis whereby said actuating means is rotated only in accordance with the rotation of said normal axis member in a plane perpendicular to the axis of motion of said vehicle; feedback potentiometer means having a rotatable member coupled to said actuating means for producing a feedback electrical signal representative of the projected angle of said normal axis defining member relative to said frame in a plane perpendicular to the axis of motion of said vehicle; comparator means coupled to said reference transducer and feedback potentiometer means producing an error signal in accordance with the algebraic sum of said reference and feedback signals; and electro-hydraulic valve means coupled to said hydraulic means and responsive to said error signal for continuously controlling the orientation of said cutting blade at said desired predetermined blade slope angle.

11. An automatic blade slope control system for use in a vehicle for road grading including a vehicle frame, a cutting blade assembly coupled to said frame, a cutting blade coupled to said assembly and rotatable about an axis normal to its cutting edge, means for rotating said cutting blade about a normal axis defining member, said cutting blade and said normal axis member being rotatable relative to a plane perpendicular to the axis of motion of said vehicle, means for rotating said cutting blade and normal axis member, and hydraulic means for controlling orientation of said cutting blade, comprising: reference sensor means having an inertial mass for defining a vertical reference axis; reference transducer means, having an element coupled to said reference sensor means, and a second element position adjustable relative to said vehicle frame and movable therewith in normal operation for producing a reference electrical signal proportional to the relative positions of said reference sensor and transducer means and representative of a desired predetermined blade slope angle; resolving means coupling said cutting blade and a feedback transducer means, said resolving means including driving means coupled to said blade and having a member rotatable about an axis parallel to said normal axis member and a first pivot support means affixed thereto for providing a pivot support axis perpendicular to said normal axis member, intermediate pivot means pivotally coupled to said pivot support means for relative pivotal motion about said pivot support axis and having second pivot support means affixed thereto for providing a second pivot support axis perpendicular to said first pivot support axis, and an actuating means having a member coupled to said feedback transducer means, said actuator means being pivotally coupled to said support means for relative pivotal motion about said second support axis whereby said actuating means is rotated only in accordance with the rotation of said normal axis member in a plane perpendicular to the axis of motion of said vehicle; feedback potentiometer means having a rotatable member coupled to said actuating means for producing a feedback electrical signal representative of the projected angle of said normal axis defining member relative to said frame in a plane perpendicular to the axis of motion of said vehicle; said reference transducer and feedback potentiometer having their elements connected in an electrical bridge circuit for producing a voltage unbalance error signal in accordance with the algebraic sum of said reference and feedback signals; and electro-hydraulic valve means coupled to said hydraulic means and responsive to said error signal for continuously controlling the orientation of said cutting blade at said desired predetermined blade slope angle.

12. An automatic blade slope control system for use in a vehicle for road grading including a vehicle frame, a cutting blade assembly coupled to said frame, a cutting blade coupled to said assembly and rotatable about an axis normal to its cutting edge, means for rotating said cutting blade about a normal axis defining member, said cutting blade and said normal axis member being rotatable relative to a plane perpendicular to the axis of motion of said vehicle, means for rotating said cutting blade and normal axis member, and hydraulic means for controlling orientation of said cutting blade, comprising: reference sensor means having an inertial mass for defining a vertical reference axis; reference transducer means, having an element coupled to said reference sensor means, and a second element position adjustable relative to said vehicle frame and movable therewith in normal operation for producing a reference electrical signal proportional to the relative positions of said reference sensor and transducer means and representative of a desired predetermined blade slope angle; resolving means coupling said cutting blade and a feedback transducer means, said resolving means including driving means coupled to said blade and having a member rotatable about an axis parallel to said normal axis member and a first pivot support means affixed thereto for providing a pivot support axis perpendicular to said normal axis member, intermediate pivot means pivotally coupled to said pivot support means for relative pivotal motion about said pivot support axis and having second pivot support means affixed thereto for providing a second pivot support axis perpendicular to said first pivot support axis and an actuating means having a member coupled to said feedback transducer means, said actuator means being pivotally coupled to said support means for relative pivotal motion about said second support axis whereby said actuating means is rotated only in accordance with the rotation of said normal axis member in a plane perpendicular to the axis of motion of said vehicle; said actuating means having a first rotatable member coupled to said intermediate pivot means, a second rotatable member coupled to said feedback transducer means and linkage means coupling said first and second rotatable members constraining said members for rotation about an axis parallel to the direction of travel of said vehicle; feedback potentiometer means having a rotatable member coupled to said actuating means second rotatable member for producing a feedback electrical signal representative of the projected angle of said normal axis defining member relative to said frame in a plane perpendicular to the axis of motion of said vehicle; said reference transducer and feedback potentiometer having their elements connected in an electrical bridge circuit for producing a voltage unbalance error signal in accordance with the algebraic sum of said reference and feedback signals; and electro-hydraulic valve means coupled to said hydraulic means and responsive to said error signal for continuously controlling the orientation of said cutting blade at said desired predetermined blade slope angle.

13. An automatic blade slope control system for use in a vehicle for road grading including a vehicle frame, a cutting blade assembly coupled to said frame, a cutting blade coupled to said assembly and rotatable about an axis normal to its cutting edge, means for rotating said cutting blade about a normal axis defining member, said cutting blade and said normal axis member being rotatable relative to a plane perpendicular to the axis of motion of said vehicle, means for rotating said cutting blade and normal axis member, and hydraulic means for controlling orientation of said cutting blade, comprising: reference sensor means having an inertial mass for defining a vertical axis; reference transducer means coupled to said reference sensor means for producing a reference electrical signal representative of a desired predetermined blade slope angle; resolving means coupling said cutting blade and a feedback transducer means, said resolving means including a pin affixed to said cutting blade assembly having an axis parallel to said normal axis defining member, driving means coupled to said blade and having a member rotatable about said pin axis and a first pivot support means affixed thereto for providing a pivot support axis perpendicular to said normal axis member, intermediate pivot means pivotally coupled to said pivot support means for relative pivotal motion about said pivot support axis and having second pivot support means affixed thereto for providing a second pivot support axis perpendicular to said first pivot support axis, and an actuating means having a member coupled to said feedback means, said actuator means being pivotally coupled to said support means for relative pivotal motion about said second support axis whereby said actuating means is rotated only in accordance with the rotation of said normal axis member in a plane perpendicular to the axis of motion of said vehicle; said actuating means having a first rotatable member coupled to said intermediate pivot means, a second rotatable member coupled to said feedback transducer means and linkage means coupling said first and second rotatable members for constraining said members for rotation about an axis parallel to the direction of travel of said vehicle; feedback transducer means having a rotatable member coupled to said actuating means second rotatable member for producing a feedback electrical signal representative of the projected angle of said normal axis defining member relative to said frame in a plane perpendicular to the axis of motion of said vehicle; comparator means coupled to said reference and feedback transducer means for producing an error signal in accordance with the algebraic sum of said reference and feedback signals; and electro-hydraulic valve means coupled to said hydraulic means and responsive to said error signal for continuously controlling the orientation of said cutting blade at said desired predetermined blade slope angle.

14. An automatic blade slope control system for use in a vehicle for road grading including a vehicle frame, a cutting blade assembly coupled to said frame, a cutting blade coupled to said assembly and rotatable about an axis normal to its cutting edge, means for rotating said cutting blade about a normal axis defining member, said cutting blade and said normal axis member being rotatable relative to a plane perpendicular to the axis of motion of said vehicle, means for rotating said cutting blade and normal axis member, and hydraulic means for controlling orientation of said cutting blade, comprising: reference sensor means having an inertial mass for defining a vertical reference axis; reference transducer means coupled to said reference sensor means for producing a reference electrical signal representative of a desired predetermined blade slope angle; resolving means coupling said cutting blade and a feedback transducer means, said resolving means including a pin affixed to said cutting blade assembly having an axis parallel to said normal axis defining member, driving means coupled to said blade and having a member rotatable about said pin axis and a first pivot support means affixed thereto for providing a pivot support axis perpendicular to said normal axis member, intermediate pivot means pivotally coupled to said pivot support means for relative pivotal motion about said pivot support axis and having second pivot support means affixed thereto for providing a second pivot support axis perpendicular to said first pivot support axis, and an actuating means having a member coupled to said feedback transducer means, said actuator means being pivotally coupled to said support means for relative pivotal motion about said second support axis whereby said actuating means is rotated only in accordance with the rotation of said normal axis member in a plane perpendicular to the axis of motion of said vehicle; said actuating means having a first rotatable member coupled to said intermediate pivot means, a second rotatable member coupled to said feedback transducer means and linkage means coupling said first and second rotatable members for constraining said members for rotation about an axis parallel to the direction of travel of said vehicle; feedback potentiometer means having a rotatable member coupled to said actuating means second rotatable member for producing a feedback electrical signal representative of the projected angle of said normal axis defining member relative to said frame in a plane perpendicular to the axis of motion of said vehicle; comparator means coupled to said reference and feedback transducer means for producing an error signal in accordance with the algebraic sum of said reference and feedback signals; and electro-hydraulic valve means coupled to said hydraulic means and responsive to said error signal for continuously controlling the orientation of said cutting blade at said desired predetermined blade slope angle.

15. An automatic blade slope control system for use in a vehicle for road grading including a vehicle frame, a cutting blade assembly coupled to said frame, a cutting blade coupled to said assembly and rotatable about an axis normal to its cutting edge, means for rotating said cutting blade about a normal axis defining member, said cutting blade and said normal axis member being rotatable relative to a plane perpendicular to the axis of motion of said vehicle, means for rotating said cutting blade and normal axis member, and hydraulic means for controlling orientation of said cutting blade, comprising: reference sensor means having an inertial mass for defining a vertical reference axis; reference transducer means coupled to said reference sensor means for producing a reference electrical signal representative of a desired predetermined blade slope angle; resolving means coupling said cutting blade and a transducer means, said resolving means including driving means coupled to said blade and having a member rotatable about an axis parallel to said normal axis member and a first pivot support means affixed thereto for providing a pivot support axis perpendicular to said normal axis member, intermediate pivot means pivotally coupled to said pivot support means for relative pivotal motion about said pivot support axis and having second pivot support means affixed thereto for providing a second pivot support axis perpendicular to said first pivot support axis, and an actuating means having a member coupled to said feedback transducer means, said actuator means being pivotally coupled to said support means for relative pivotal motion about said second support axis whereby said actuating means is rotated only in accordance with the rotation of said normal axis member in a plane perpendicular to the axis of motion of said vehicle; feedback transducer means having a rotatable member coupled to said actuating means for producing a feedback electrical signal, representative of the projected angle of said normal axis defining member relative to said frame in a plane perpendicular to the axis of motion of said vehicle; said reference and feedback transducers having their elements connected in an electrical bridge circuit for producing a voltage unbalance error signal in accordance with the algebraic sum of said reference and feedback signals; and electro-hydraulic valve means for varying the flow of fluid to said hydraulic means in response to said error signal for continuously controlling the orientation of said cutting blade at said desired predetermined blade slope angle.

16. An automatic blade slope control system for use in a vehicle for road grading including a vehicle frame, a cutting blade assembly coupled to said frame, a cutting blade coupled to said assembly and rotatable about an axis normal to its cutting edge, means for rotating said cutting blade about a normal axis defining member, said cutting blade and said normal axis member being rotatable relative to a plane perpendicular to the axis of motion of said vehicle, means for rotating said cutting blade and normal axis member, and hydraulic means for controlling orientation of said cutting blade, comprising: reference sensor means having an inertial mass pivotal about an axis for defining a vertical reference axis; reference transducer means, having an element coupled to said reference sensor means, and a second element position adjustable relative to said vehicle frame and movable therewith in normal operation for producing a reference electrical signal proportional to the relative positions of said reference sensor and transducer means and representative of a desired predetermined blade slope angle; resolving means coupling said cutting blade and a feedback transducer means, said resolving means including a pin affixed to said cutting blade assembly having an axis parallel to said normal axis defining member, driving means coupled to said blade and having a member rotatable about said pin axis and a first pivot support means affixed thereto for providing a pivot support axis perpendicular to said normal axis member, intermediate pivot means pivotally coupled to said pivot support means for relative pivotal motion about said pivot support axis and having second pivot support means affixed thereto for providing a second pivot support axis perpendicular to said first pivot support axis, and an actuating means having a member coupled to said feedback transducer means, said actuator means being pivotally coupled to said support means for relative pivotal motion about said second support axis whereby said actuating means is rotated only in accordance with the rotation of said normal axis member in a plane perpendicular to the axis of motion of said vehicle; said actuating means having a first rotatable member coupled to said intermediate pivot means, a second rotatable member coupled to said feedback transducer means and linkage means coupling said first and second rotatable members for constraining said members for rotation about an axis parallel to the direction of travel of said vehicle; feedback potentiometer means having a rotatable member coupled to said actuating means second rotatable member for producing a feedback electrical signal representative of the projected angle of said normal axis defining member relative to said frame in a plane perpendicular to the axis of motion of said vehicle; said reference transducer and feedback potentiometer having their elements connected in an electrical bridge circuit for producing a voltage unbalance error signal in accordance with the algebraic sum of said reference and feedback signals; and electro-hydraulic valve means for varying the flow of fluid to said hydraulic means in response to said error signal for continuously controlling the orientation of said cutting blade at said desired predetermined blade slope angle.

17. An automatic blade slope control system for use in a vehicle for road grading; including a vehicle frame, a cutting blade assembly coupled to said frame, a cutting blade coupled to said assembly, a vertical reference sensor fixedly mounted with respect to the frame, a reference transducer operatively connected to said vertical sensor and producing a signal representative of the desired slope angle relative to said frame, resolving means, feedback transducer means, said resolving means interconnecting said blade and said feedback transducer means to drive said feedback transducer means through an angle directly linearly proportional to an actual projected blade angle relative to said frame in all positions of said tool, said feedback transducer producing a signal indicative of said projected blade cutting angle relative to said frame, a comparator, said comparator simultaneously receiving said reference transducer signal and said feedback transducer signal and having an output error signal representative of the algebraic sum of the signals received, an electro-hydraulic valve, said electro-hydraulic valve being controlled by said comparator output signal, a hydraulic actuator connected to said electro-hydraulic valve and operated thereby in response to said comparator output error signal, said hydraulic actuator being drivingly connected to one end of the said blade whereby there is established continuous linear angular control of said blade irrespective of its position relative to the frame.

18. An automatic tool slope control system, including:
a vertical frame,
a tool assembly coupled to said frame,
a tool coupled to said assembly,
a vertical reference sensor fixedly mounted with respe t to the frame,
a reference transducer operatively connected to said vertical sensor and producing a signal representative of the desired slope angle relative to said frame, resolving means, said resolving means interconnecting said tool and said feedback transducer means to drive said feedback transducer means through an angle directly linearly proportional to an actual projected tool angle relative to said frame in all positions of said tool, said feedback transducer producing a signal indicative of said projected tool angle relative to said frame, a comparator, said comparator simultaneously receiving said reference transducer signal and said feedback transducer signal and having an output error signal representative of the algebraic sum of the signals received, a valve, said valve being controlled by said comparator output signal, an actuator connected to said valve and operated thereby in response to said comparator output signal, said actuator being drivingly connected to one end of said tool whereby there is established continuous linear angular control of said tool irrespective of its position relative to the frame.

References Cited in the file of this patent

UNITED STATES PATENTS

| | | |
|---|---|---|
| 2,766,731 | Brandes | Oct. 16, 1956 |
| 2,902,979 | Gurries et al. | Sept. 8, 1959 |
| 2,904,911 | Colee | Sept. 22, 1959 |
| 2,905,878 | Olson | Sept. 22, 1959 |
| 2,929,362 | Hayner | Mar. 22, 1960 |
| 2,931,965 | Bell | Apr. 5, 1960 |
| 2,941,319 | Beemer | June 21, 1960 |

FOREIGN PATENTS

| | | |
|---|---|---|
| 537,077 | Italy | Dec. 15, 1955 |